US005622468A

United States Patent [19]

Viollet

[11] Patent Number: 5,622,468

[45] Date of Patent: Apr. 22, 1997

[54] DISPOSAL FACILITY FOR LOADING OBJECTS INTO A CONTAINER

[75] Inventor: Michel Viollet, Chavanod, France

[73] Assignee: Robin S.A., Meaux Cedex, France

[21] Appl. No.: 424,392

[22] PCT Filed: Oct. 27, 1993

[86] PCT No.: PCT/FR93/01049

§ 371 Date: Jul. 13, 1995

§ 102(e) Date: Jul. 13, 1995

[87] PCT Pub. No.: WO94/10076

PCT Pub. Date: May 11, 1994

[30] Foreign Application Priority Data

Oct. 30, 1992 [FR] France .................................. 92/13261

[51] Int. Cl.$^6$ ..................................................... B65G 65/32

[52] U.S. Cl. .......................... 414/422; 414/404; 414/414; 414/403; 414/266; 414/460; 414/626; 414/749; 294/68.23; 220/908

[58] Field of Search ..................................... 414/266, 267, 414/624, 626, 268, 422, 423, 424, 749, 751, 414, 459, 460, 403, 404; 220/909, 1.5, 908, 68.1, 68.2, 68.21, 68.22, 68.23, 68.24, 68.26, 68.27, 68.3; 254/98, 100; 187/267

[56] References Cited

U.S. PATENT DOCUMENTS

| | | | |
|---|---|---|---|
| 3,973,683 | 8/1976 | Keller . | |
| 4,904,142 | 2/1990 | Sato | 414/142.6 |
| 5,297,481 | 3/1994 | Robbins et al. | 220/909 X |
| 5,478,186 | 12/1995 | Zuidema | 414/404 |

FOREIGN PATENT DOCUMENTS

| | | | |
|---|---|---|---|
| 154924 | 6/1952 | Australia | 294/68.23 |
| 2063613 | 6/1992 | Canada | 414/404 |
| 0329574 | 8/1989 | European Pat. Off. | B66F 9/00 |
| 908564 | 4/1946 | France | 294/68.23 |
| 2540087 | 8/1984 | France | B66C 13/48 |
| 2047537 | 3/1972 | Germany . | |
| 8633746 | 7/1989 | Germany . | |
| 4218742 | 12/1993 | Germany | 220/908 |
| 1486418 | 6/1989 | U.S.S.R. | 414/422 |
| 1655859 | 6/1991 | U.S.S.R. | 414/404 |
| 606743 | 9/1948 | United Kingdom . | |
| 9008714 | 8/1990 | WIPO | 220/909 |

*Primary Examiner*—Frank E. Werner
*Attorney, Agent, or Firm*—Greenblum & Bernstein P.L.C.

[57] ABSTRACT

A disposal facility for loading objects stored in a bin into a container. The facility includes a plurality of subassemblies, each having a bin and a container. A movable gantry is disposed for movement over each of the subassemblies. A movable gripping assembly, coupled to a carriage traversing an upper section of the gantry, moves perpendicular to the direction of movement of the carriage. The movable gripping assembly includes an activation device for raising the bin, from a rest position to a position above the container, opening the bottom of the bin, closing the bottom of the bin, and replacing the bin to its original rest position.

12 Claims, 7 Drawing Sheets

DISPOSAL FACILITY FOR LOADING OBJECTS INTO A CONTAINER

BACKGROUND OF THE INVENTION

1. Field of the Invention

The present invention relates to a disposal facility for loading a container of large dimension which is opened at its upper portion. It relates more particularly to a perfected disposal facility.

2. Description of Background and Relevant Information

The loading of a container can present certain difficulties of material handling when the container is of large dimension and/or when the elements to be loaded are heavy or cumbersome. In certain cases, the person loading the container is not experienced and/or does not have available a specific apparatus or machine adapted for material handling i.e., a crane, a loader or any other universal machine. Such a situation occurs, for example, when containers are installed in public places so that population can dispose of cumbersome objects. The solution commonly adopted includes a platform with an edge in the vicinity of an upwardly open upper portion of the container, thus making it possible for any person to throw objects therein.

A loading platform presents numerous disadvantages. The provision of a platform requires substantial and costly construction. Furthermore, the place occupied by the container, the platform and its access ramp is relatively substantial, and the installation is not movable. Because the platform is level with only one lateral edge of the container, the loading is always carried out on the same side and the container is not filled in a uniform manner. Often, objects pass between the container and the edge of the platform, and it is necessary to clean the location frequently. Finally, a platform may be dangerous to surrounding property or people, particularly children.

Furthermore, known installations for collecting public waste are not properly suited for urban use because they do not respond to the most elementary criteria of health safety, architectural quality and environmental management.

SUMMARY OF THE INVENTION

Such installations have been improved by the apparatus described in European Patent No. 0329 574, but the present invention yet provide further improvements by proposing an installation in which a plurality of containers are associated with various bins, while the loading apparatus is movable and disconnectable with respect to the various bins.

Thus, the disposal facility for loading objects stored in a bin into a container comprises activation means adapted to

- raise the bin above the container,
- retract the bottom of the bin to let objects in the container fall,
- close the bottom of the bin and reposition it on the ground in front of the container.

According to the present invention, the disposal facility includes at least two subassemblies, and an activation unit. The at least two sub-assemblies may include a container and a bin, the activation means may include a movable gantry displacable with respect to the ground, into the space occupied by storage subassemblies to be placed above one or the other of the subassemblies. The gantry, which may carry a movable carriage displacable into the space occupied by the container and the bin, may include a gripping assembly. The gripping assembly may include a removable connection means and the activation unit of the bin.

According to one aspect of the invention, each of the storage subassemblies is provided such that the bin is resting on the ground in front of a corresponding container and spaced therefrom to create an intermediate space.

According to another aspect of the invention, each of the storage subassemblies is arranged parallel to an adjacent subassembly and separated therefrom to create a longitudinal adjacent space between two adjacent subassemblies.

According to yet another aspect of the present invention, the gantry is movable along two guiding and rolling paths or rails, a front rail extends transversely into the intermediate space between the containers and the bins, and a rear rail extends parallel to the front rail and transversely behind the containers. Four vertical poles are also provided including at least one horizontal beam extending frontwardly, beyond the plane of two vertical front poles, and on which the carriage is mounted for translation movement.

According to another aspect of the present invention, the carriage may include a gripping assembly which is vertically movable to pass from an upper position to a lower position and vice versa. The movable gripping assembly may include a removable connection unit and the activation unit. The removable connection unit includes a connection motor for activating gripping jaws through a screw-nut system, while the activation unit of the bin includes an activation motor and a movable coupling.

BRIEF DESCRIPTION OF THE DRAWINGS

Other characteristics and advantages of the invention will become clear from the description which follows with reference to the annexed drawings which are given by way of non-limiting example only.

Figure 6:
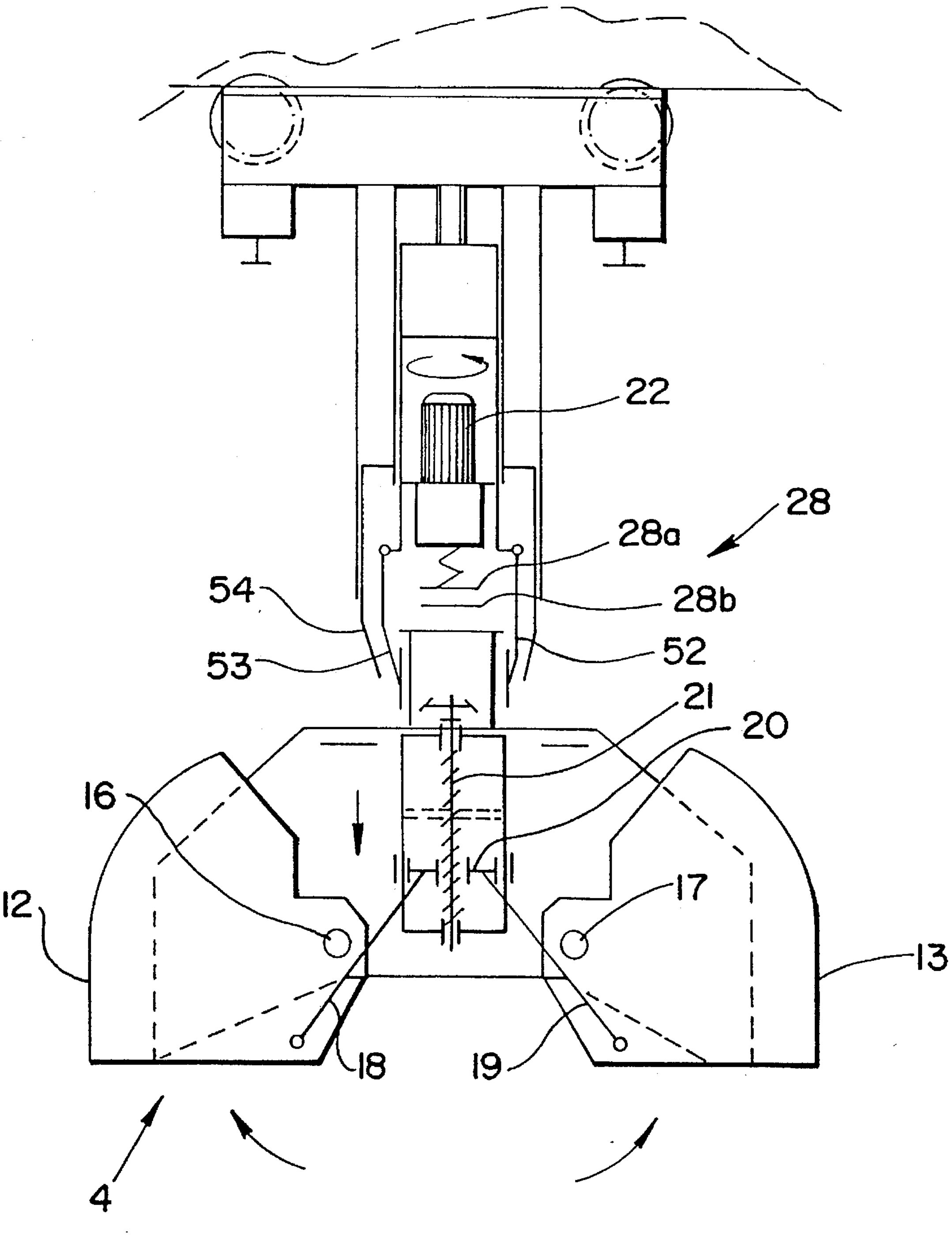
Figure 7:
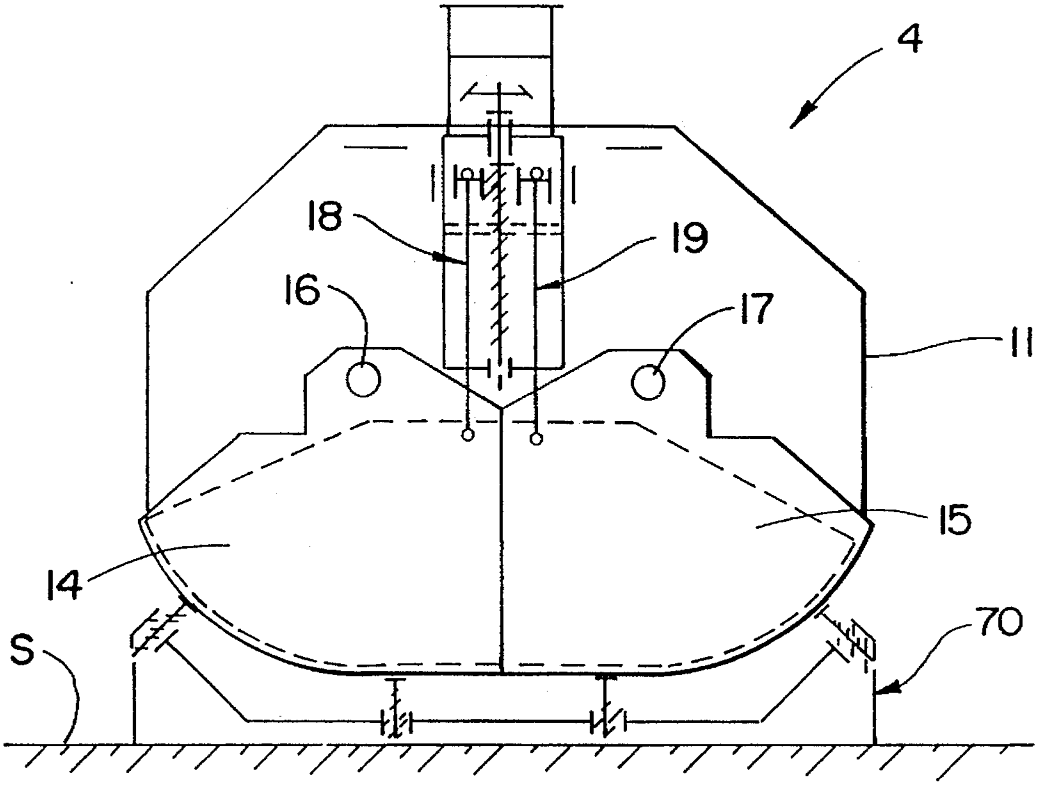

FIG. **5*a*** shows a connection means of the bin in a disconnected position;

FIG. **5*b*** is a lateral view illustrating the bin in a waiting position resting on the ground;

FIG. 6 is a lateral view showing the bin in a position which frees wastes into a container; and FIG. 7 is a view similar to FIG. **5*b*** illustrating an improvement in which the bin is not directly resting on the ground.

DETAILED DESCRIPTION OF PREFERRED EMBODIMENTS

Figure 1:
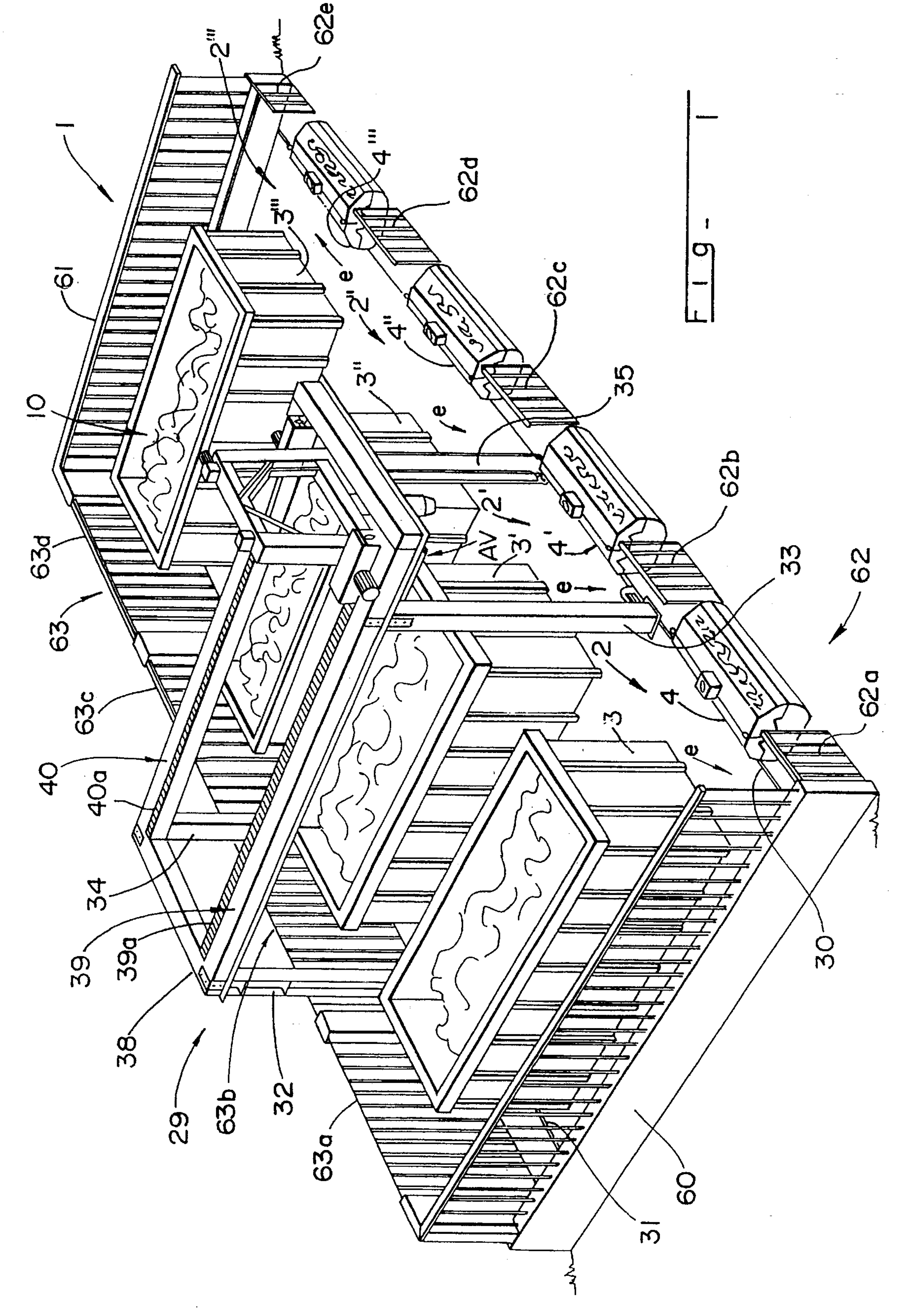
FIG. 1 is a perspective view of the disposal facility according to the invention.
Figure 2:
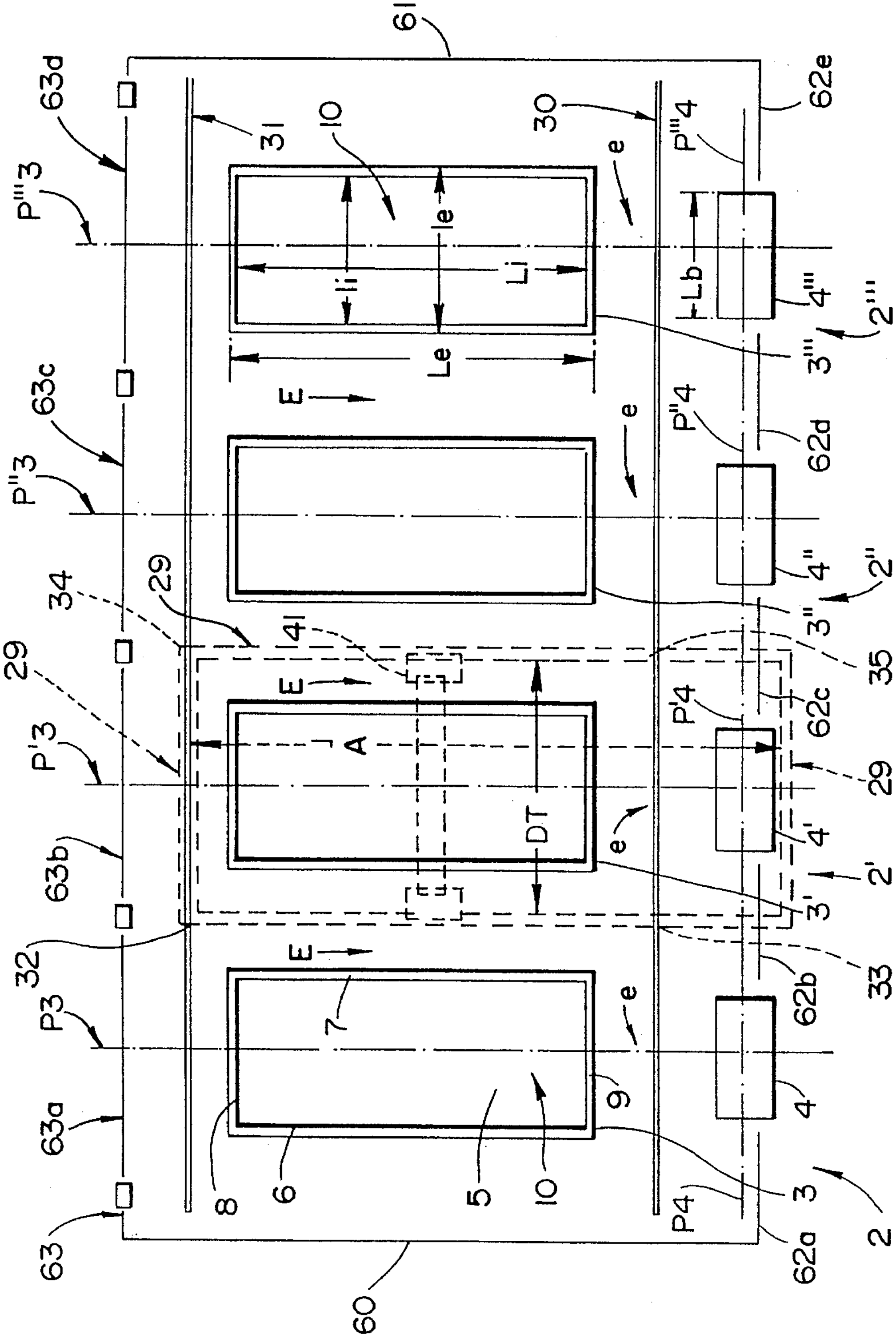
FIG. 2 is a schematic top view of the disposal facility, a gantry being shown in dashed lines.
Figure 3:
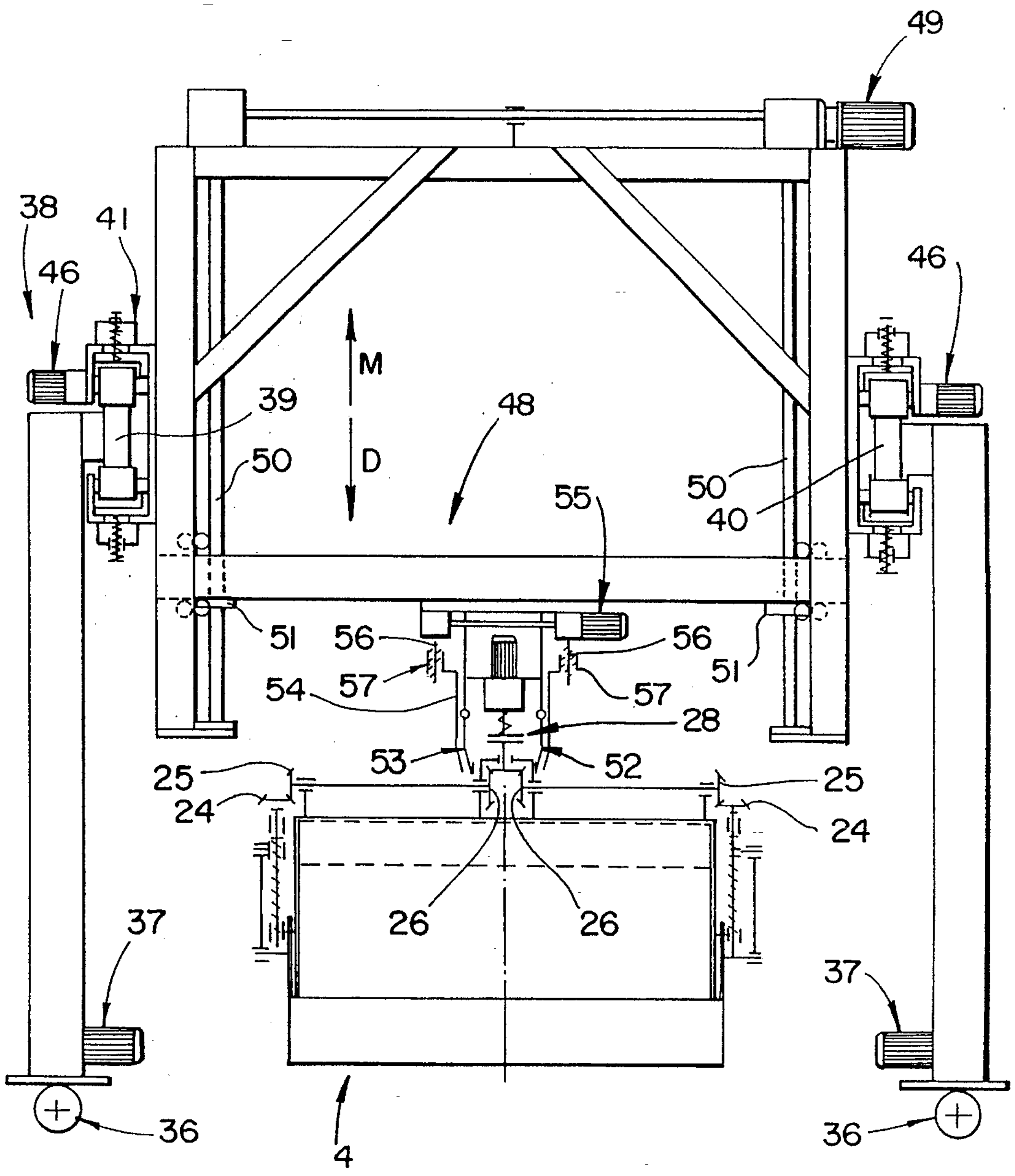
FIG. 3 is a front view showing gantry, with a carriage in the position of raising a bin.
Figure 4:
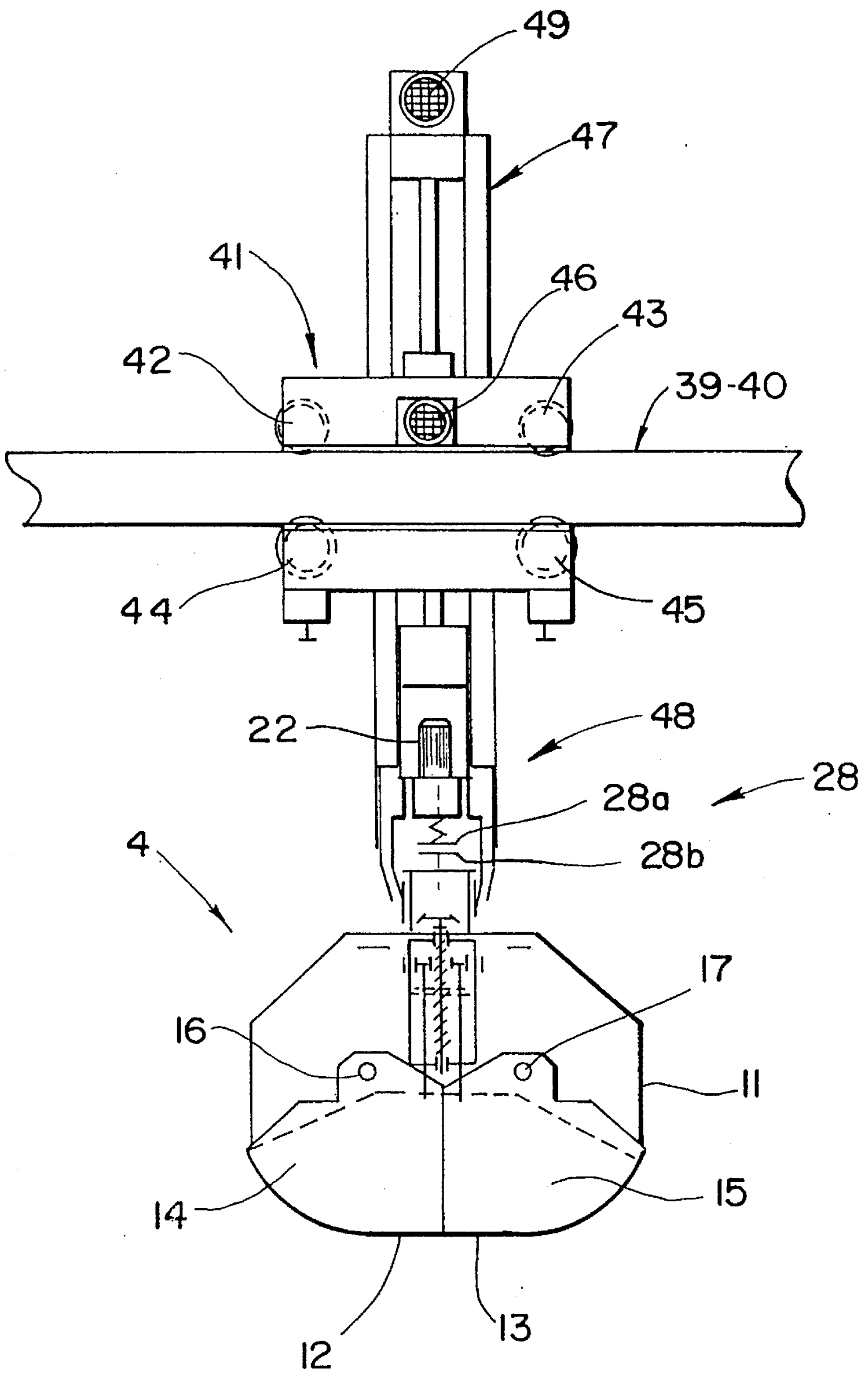
FIG. 4 is a lateral view of FIG. 3 illustrating more particularly the carriage with the bin.
Figure 5A:
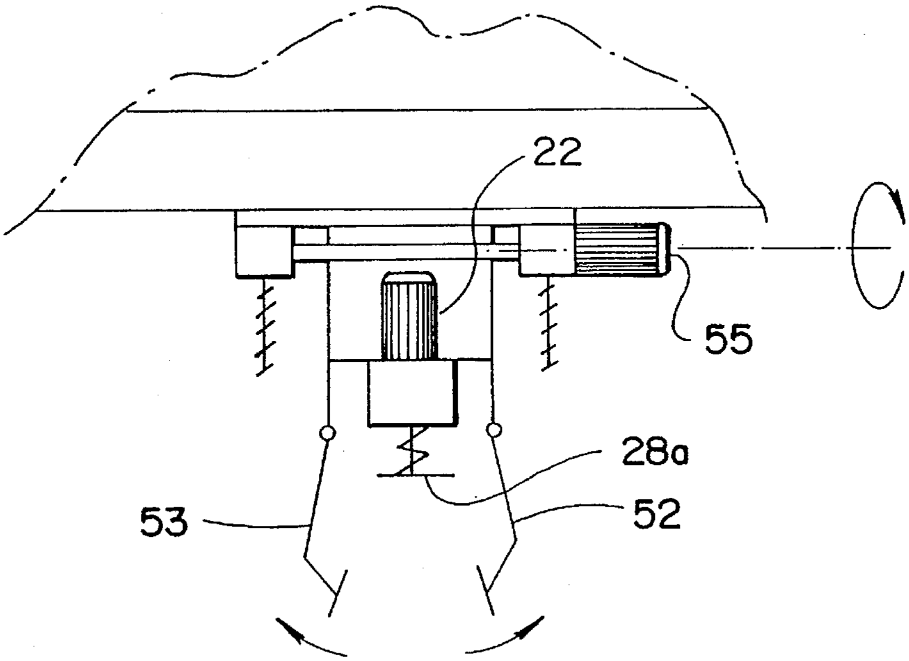
Figure 5B:
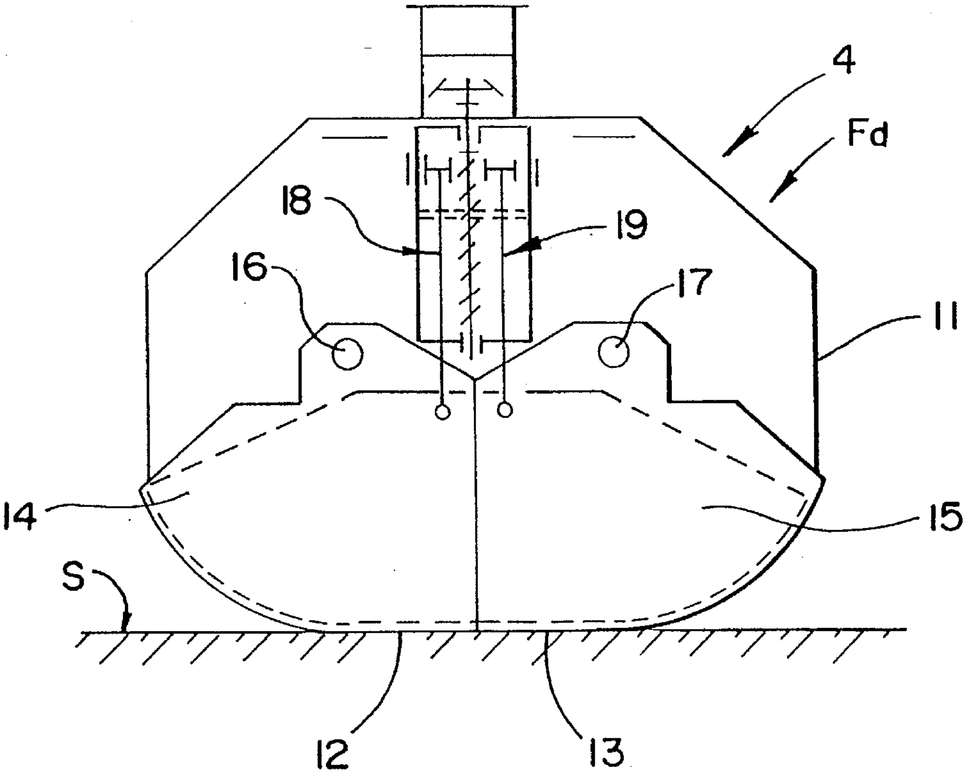

FIGS. 1 and 2 show a disposal facility according to the present invention, generally designated by reference numeral (1) and which comprises at least one material storage subassembly (2). According to one of the characteristics of the invention, the installation (1) comprises a plurality of storage subassemblies (2) for example, four (storage assemblies 2, 2', 2", 2'" may be provided). Each storage subassembly (2) is constituted by a container (3) to which adjoins a corresponding bin (4). The container has, for example, a capacity of 30 $m^3$ and a height of 2.20 meters. It has a generally parallelpipedic shape and is opened upwardly at its upper portion and comprises a longitudinal and vertical plane of general symmetry (P3). The container also comprises a lower wall (or bottom) (5), two longitudinal walls (6, 7) extending upwardly parallel to each other and parallel to the plane (P3), and two end walls (8, 9) perpendicular to the plane (P3) to form a principal storage enclosure (10) of width (li) and of length (Li). Of course, the container can have any other shape without going beyond the scope of the invention. Associated with the container is a bin (4) of a smaller capacity than that of the corresponding container 5. The bin has a substantially parallelpipedic shape and comprises a retractable bottom. According to one particular arrangement of the bin, its exterior length (Lb) is slightly less than the internal width (li) of the container. The upper portion of the bin 4 is opened at least partially upwardly. At its rest position, the bin rests on the ground, or on an appropriate support, in front of the corresponding container 5 to form an intermediate space (e) between the container 5 and the bin 4. It should further be noted that the bin (4) comprises a plane (P4) of general symmetry and that in its rest position, the plane (P4) is perpendicular to the plane (P3). As shown in FIG. 4, the bin 4 may include a peripheral wall (11) constituting its rigid structure and the bottom thereof is constituted by two walls (12, 13) whose respective lateral extensions (14, 15) are journalled on the lateral end walls of the structure along axes (16, 17). The movements for spacing and bringing together the walls (12, 13) are controlled on each side by two lateral connecting rods (18, 19) (shown in FIG. 6) of which one of the ends is journal mounted on the corresponding lateral wall, while the other of the ends is journalled on a nut (20) controlled by a vertical screw (21) whose rotation is controlled by a motor (22) connected to the movable gripping assembly 48 and by means of a pinion system (24, 25, 26) and a movable coupling (28). FIG. 5*b* illustrates the bin in its closed position making it possible for the user to load through the area indicated by an arrow (Fd), while FIG. 6 illustrates it in its position opened for freeing waste.

According to one aspect of the invention, the installation (1) comprises a succession of storage subassemblies (2), that is to say a plurality of subassemblies, as can be seen more particularly in FIG. 2. By way of example and as is illustrated, the disposal facility comprises a succession of four storage subassemblies (2–2''') positioned side by side and parallel. Thus, the planes of general symmetry (P3–P''') representing the first (2), second (2'), third (2'') and fourth subassembly (2''') respectively are parallel. It should be noted also that each storage subassembly (2–2''') is spaced from adjacent storage subassemblies, to create between each of them, a longitudinal adjacent space (E). Thus, an installation storage assembly comprises on the one hand a row of containers (3, 3', 3'', 3''') and on the other hand, a row of corresponding bins (4, 4', 4'', 4''').

Activation means are constituted by a movable gantry (29) which can move in the space occupied by the storage assembly. Thus, the gantry 24 is displaced on the ground transversely with respect to the various planes (P3, P3', P3'', P3''') along two guiding and rolling paths (30, 31). Thus, the facility further comprises, for example two rails (30, 31) extending perpendicularly with respect to the different planes (P3, P3', P3'', P3'''), namely a front rail (30) extending into an intermediate space, formed between the containers (3, 3', 3'', 3''') and the bins (4, 4', 4'', 4'''), and a rear rail (31) extending transversely behind the containers (3, 3', 3'', 4'''). It should be noted that the two rails (30, 31) serve both as a guiding path and a rolling path for the movable gantry (29) which comprises four vertical poles (32, 33, 34, 35) whose lower ends comprise one or more wheels (36) as well as an electric control motor (37). The vertical poles (32, 33, 34, 35) carry an upper structure (38) constituted by a rigidification frame including in particular two upper horizontal beams (39, 40) adapted to support and guide the movement of a carriage (41) adapted for the activation and the manipulation of the bins (4, 4', 4'', 4'''), as will be described below. The upper horizontal beams (39, 40) each carry a rack (39*a*, 40*a*).

It should be noted that the distances between the various vertical beams of the gantry are greater than the exterior dimensions of the containers. Thus, the distance (DT) between the two front poles (33, 35) is greater than the exterior width (le) of the containers, and the distance (DL) between one of the front poles, e.g., (33) and one of the rear poles, e.g., (32) is greater than the exterior length (Le) of said containers. It should also be noted that the distance (DT) between the two front poles (33, 35) is greater than the length (Lb) of the different bins (4, 4', 4'', 4''') to allow for their passage during handling.

Furthermore, the upper structure (38) constitutes a horizontal plane extending towards the front (AV) beyond the vertical plane of the front poles (33, 35), such that the two upper horizontal poles extend frontwardly and above a zone occupied by the bins. This arrangement allows for the carriage to be able to position itself above the bins.

The carriage, (41), shown in FIG. 4 comprises on each side, four rollers (42, 43, 44, 45) and an electric motor (46) to control the rotation of the upper rollers (42, 43). Furthermore, said carriage comprises a vertical skeleton (47) carrying a movable gripping assembly (48) whose vertical movements upwardly and downwardly are controlled by a motor (49) which activates the gripping assembly (48) by virtue of a screw-nut type transmission system (50, 51). Thus, the carriage may be displaced vertically to either descend along a direction (D) to place itself in a lower position, or rise along a direction (M) to place itself in an upper position. The gripping assembly (48) comprises at its lower portion, means for connecting and activating the bins. The activation means are adapted to activate the bottom of the bin to pass from its closed waiting position (FIG. 5*a*) to its opened active position (FIG. 6). This allows for the discharge of waste. Conversely, the activation means also activates the bin for a transition from the active opened position to the closed waiting position, such that the bin is replaced in its waiting position. The activation means are constituted by an electric motor (22) and a coupling (28*a*), the bin carrying complementary coupling means (28*b*). The coupling means (28) are movable and are constituted by a portion (28*a*) affixed to the gripping assembly, adapted to cooperate with the complementary portion (28*b*) affixed to the bin. This coupling can be of the friction or nesting type, or any other appropriate type.

The connection means are movable and constituted for example by two lateral elements (52, 53) forming gripping jaws, movable between an opened connection position and a closed connection position. This latter position is assured by a sliding casing (54) whose vertical displacements are controlled by an electric motor (55) and by means of screw-nut systems (56, 57).

FIGS. 1, 2, 5*a* and 5*b* illustrate the installation in the waiting or rest position. In this position, each of the bins (4, 4', 4'', 4''') have their respective bottoms closed and rest on the ground in front of their respective corresponding container (3, 3', 3'', 3'''). Thus, users can deposit their waste into the bins at will. According to one arrangement of the disposal facility each of the bins is adapted to receive one particular type of waste. For example, the first bin (4) may be used to receive metals, the second bin (4') may receive incineratable products, the third bin (4"), glass, and the fourth bin (4'") may receive diverse products. Thus, the user himself performs the sorting and disposes of the waste into the corresponding bins.

Once one of the bins is filled, the gantry is displaced laterally to be placed above the corresponding storage the operator.

When one or the other of the bins is full, the operator or user displaces the gantry (38) by activating the motors (37) for displacement thereof, to bring it above the selected subassembly. Then, if the carriage is waiting above the space occupied by the bins, namely, in the front portion of the gantry, the operator need only lower the movable gripping assembly (48) to connect to said bin. The bin is then lifted to the upper position and displaced towards the rear of a gantry 29. When the bin is positioned above the corresponding container, the bottom of the bin is opened to free the waste and let them fall into the container. The bin is then returned to the waiting position and may be disconnected from the carriage.

It can also be noted that the apparatus makes it possible to load a container in a uniform manner by freeing the waste in the desired portion of the container. It is furthermore noted that it is possible on the one hand to distribute the wastes in the container by virtue of the horizontal displacement of the bin, and on the other hand, to pack and compact said wastes by virtue of the downward displacement of said bin within the container.

Another advantage of the loading installation described above is that it is not very cumbersome, and thus well adapted to being installed in an urban area. Furthermore, the disposal facility of the present invention may be enclosed to constitute an architecturally satisfactory assembly in the context of an urban plan.

Thus, the disposal facility is for example peripherally limited by a peripheral barrier preventing, or at least limiting the access to the site by unauthorized personnel. Thus, the peripheral barrier comprises two lateral barriers (60, 61) which are continuous, while the front barrier and the rear barrier are discontinuous. Thus, the front barrier (62) is constituted by a plurality of front barrier portions (*62a*, *62b*, *62c*, *62d*, *62e*) to create interruptions adapted to receive the bins and to thus allow the user to have unimpeded access to load the bins. Likewise, the rear barrier (63) comprises behind each of the containers (3, 3', 3", 3'") a movable door (*63a*, *63b*, *63c*, *63d*, *63e*) allowing for the access to trucks adapted to pick up the containers to evacuate them when they are full.

FIG. 7 illustrates an improvement to the installation, in which the bins (4, 4', 4", 4'") are not directly resting on the ground (S), as is shown in FIG. *5b*, but adapted in a manner so as to situate the bins in a predetermined position.

One can envision that such an installation be either directly accessible to the users, or relegated to an official having, for example, keys for opening the door of the site and activating the loading apparatus.

Furthermore the installation can be computer controlled. Indeed, beyond the only controls of residential locations of users presently performed, it can be very useful to well know the population using the disposal and the nature and the quantity of their waste. Thus, each user can be given an access card comprising a certain amount of information, such as the name, address, profession, as well as information concerning the weight of the waste allowed by the card. Thus, in this case, the user, before getting rid of his waste, presents his card to the guardian which introduces it in a reader. The wastes deposited are then weighed and automatically qualified and the value of the card is then automatically calculated.

Of course, the invention is not limited to the embodiment described and shown by way of examples, but it also comprises all the technical equivalents as well as their combinations, the present invention being susceptible to variations which will appear to one of skill in the art.

What is claimed:

1. A disposal facility for loading objects stored in a bin into a container, said disposal facility comprising:

a plurality of storage subassemblies, each of said plurality of storage subassemblies comprising a container and a bin;

a movable gantry, positionable above a selected one of said storage subassemblies, comprising a horizontal upper structure;

a carriage for traversing said horizontal upper structure;

a gripping assembly, carried by said carriage and movable relative to said horizontal upper structure, comprising connection means and activation means;

said activation means comprising means for raising a selected bin, associated with said selected storage subassembly, from the rest position; means for moving said selected bin; means for retracting a bottom portion of said selected bin; means for closing said bottom portion of said selected bin; and means for restoring said selected bin to said rest position.

2. The disposal facility according to claim 1, wherein the bin and the container of each of said plurality of storage subassemblies is arranged such that the bin is positioned in front of the container and spaced therefrom to create an intermediate space.

3. The disposal facility according to claim 2, wherein said plurality of storage subassemblies is positioned parallel to each other and separated from each other by a longitudinal adjacent space wherein each of said intermediate spaces are colinearly positioned.

4. The disposal facility according to claim 3, wherein said gantry is movable on a guide path comprising a front rail extending transversely in said intermediate space, and a rear rail, parallel to said front rail, extending transversely behind the containers.

5. The disposal facility according to claim 1, wherein said gantry further comprises four vertical poles supporting said horizontal upper section, said horizontal upper section extending frontwardly beyond a plane established by two of said vertical poles positioned between said selected bin and said selected carriage.

6. The disposal facility according to claim 5, wherein said gripping assembly is movable vertically to traverse from an upper position to a lower position and conversely.

7. The disposal facility according to claim 6, wherein said connection means comprise means for actuating gripping jaws.

8. The disposal facility according to claim 7, wherein said activation means comprise an activation motor (22) and a movable coupling.

9. The disposal facility according to claim 10, wherein said actuating means comprise a connection motor and a screw-nut system.

10. The disposal facility according to claim 1, wherein a peripheral barrier surrounds said plurality of storage subassemblies.

11. The disposal facility according to claim 10, wherein said peripheral barrier comprises a front barrier which includes a plurality of interruptions;

each of said plurality of interruptions corresponding with, and receiving, a predetermined bin at rest.

12. The disposal facility according to claim 1, wherein said facility comprises four storage subassemblies positioned side by side.

* * * * *